Oct. 21, 1969   E. G. BYRNES   3,473,867
GLARE-REDUCING REARVIEW MIRROR DEVICE
Filed Dec. 13, 1965

INVENTOR
EDWARD G. BYRNES
BY
BROWN and MIKULKA
ATTORNEYS

United States Patent Office 3,473,867
Patented Oct. 21, 1969

3,473,867
GLARE-REDUCING REARVIEW MIRROR DEVICE
Edward G. Byrnes, Medfield, Mass., assignor to Polaroid Corporation, Cambridge, Mass., a corporation of Delaware
Filed Dec. 13, 1965, Ser. No. 513,326
Int. Cl. G02b 7/18, 17/00
U.S. Cl. 350—279                                              1 Claim

ABSTRACT OF THE DISCLOSURE

A rearview mirror including novel structures for varying the reflection of incident light rays.

---

The problem of glare, as particularly caused by the headlamps of a following vehicle, at "high-beam," is well known to every driver of an automobile and, admittedly, constitutes one of the hazards of present night-time driving. While devices of considerable effectiveness in overcoming this problem have been developed in conjunction with the usual rectangular mirror positioned in front of or slightly overhead of the windshield, they have not been ideally satisfactory as to light control and have not, at least to a practical or accepted degree, been adapted to incorporation with the circular or otherwise curved mirror usually located externally of the vehicle, adjacent to the driver.

Known devices for the purpose have, for example, involved the introduction of a partially light-absorbing medium into the path of the light rays or the use of a light-transmitting element which is angularly adjustable to two positions to permit either reflection from a first surface thereof or transmission by the first surface and reflection from a second mirrored surface. Through such an instrumentality, however, but two choices of reflectivity are possible, namely, a given minimum or a given maximum. These options, although useful, discount the possibility that the high beams of following cars may vary somewhat in angle and intensity and that the glare produced thereby is not a constant factor. Devices presently available also fail to meet the situation that at times it may be desirable to adjust the rear-view mirror to some reflective setting intermediate of the aforesaid minimum or maximum, where a compromise between glare reduction and perception of objects to the rear is desirable. For example, a rearview mirror, of a conventional type above-described involving an adjustable light-transmitting element, may reflect from its front surface as little as four-percent of light coming from the rear. Previous suggestions of employing light polarizing means for a related purpose, as for example, two adjustable linear polarizers, involve an inherent deficiency, namely, that too much light is absorbed when maximum reflectivity is desired. Employing such devices any remedy for the aforesaid light loss is either practically impossible or would involve cumbersome adjusting means.

With these considerations in view, an object of the present invention is to provide a novel, manually adjustable, rearview mirror device having a continuously-variable useful range of reflectivity between a given minimum and a given maximum.

Other objects are to provide a novel device of the character described which embodies relatively adjustable light polarizing and retardation elements employed in a more efficient manner than has herebefore been known; to provide a device of the aforementioned type which is adapted to either a rectangularly shaped structure or a curved structure such as one having a circular shape; and to provide a device of the aforesaid category which is of a sufficiently simple construction to be economically feasible and adequately rugged to withstand usage under weathering or other conditions associated with driving a motor vehicle.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claim.

For a fuller understanding of the nature and objects of the invention; reference should be had to the following detailed description taken in connection with the accompanying drawing wherein.

Figure 1:
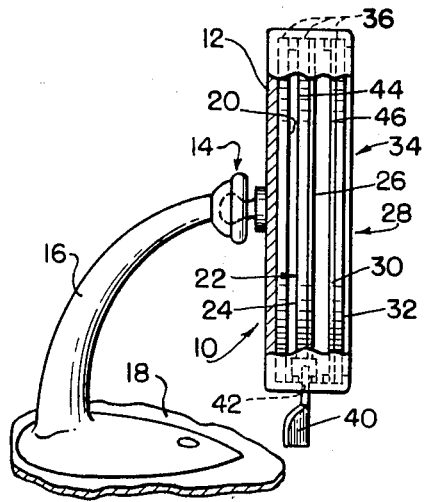
FIGURE 1 is a diagrammatic side view, with parts broken away of one embodiment of the rearview mirror device of the present invention.
Figure 2:
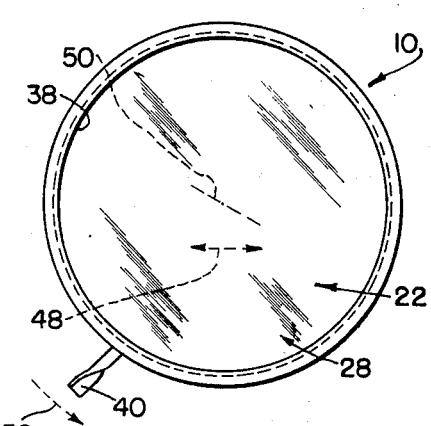
FIG. 2 is a diagrammatic, fragmentary facing view of the device of FIG. 1.

Referring now to FIGURES 1 and 2, there is shown one adaptation of a rearview mirror device 10 of the invention. A circular housing or casing 12 enclosing the various functional elements is attached by suitable adjustable means such as the ball-and-socket component 14, and the integral arm and mounting bracket 16 to a portion 18 of a motor vehicle so that the device faces functionally to the rear. Within the housing 12 are mounted, from left-to-right as viewed in FIGURE 1, a plurality of circularly shaped components as follows: a reflecting elements 20 such as a front-surface mirror, a composite element 22 including a light-transmitting disk 24, e.g., composed of glass, having a quarter-wave retardation plate 26 laminated thereto, and a composite element 28 including a linear light polarizing film 30 laminated to a light-transmitting disk 32. The disk 32 is also preferably composed of glass and covers the open face 34 of the device through which light from the rear, and more particularly beams from the headlamps of the following vehicle, are admitted.

The elements 20, 22 and 28 are mounted in parallel relation in grooves or flanges 36, provided within the housing, in conjunction with a rim or bezel 38 surrounding the aforsaid open face. Elements 20 and 22 are fixedly mounted. The element 22 is mounted for rotation within its groove as, for example, by the provision therein of a suitable plastic lining for reducing friction. It is actuated by a handle 40, integral therewith, which projects through an elongated slot 42 formed in the lower portion of the housing 12.

While the elements 22 and 28 are illustrated as separated from facing surfaces adjacent thereto by air gaps 44 and 46, they may be so mounted as essentially to contact these surfaces, with, for example, a thin layer of oil having an index of refraction approximating that of one of the facing surfaces existing therebetween. Assuming a contiguity of the elements, a choice of materials permitting a similarity of refractive indices thereof is desirable to reduce internal reflections. It is to be understood that suitable sealing means, such as gaskets or the like, not shown, are employed both to prevent the entrance of moisture or dust or the seepage of an oil, if employed.

Wherein the surfaces are spaced as shown, conventional reflection-reducing coatings may be applied thereto to advantage.

The optical properties of the composite elements 22 and 28 are illustrated in FIG. 2. The vibration direction or azimuth of the light polarizing film component 30 of element 28 is indicated by the double-headed arrow 48. The optic axis of the retardation plate component 26 of rotatable element 22 is represented at 50. Optic axis 50 and vibration direction or polarizing axis 48 are shown relatively disposed at an angle which, for example, is slightly less than 45°, for instance one of 40°. At this relation, a very small amount of the entering light which is incident upon and reflected by the mirror 20 emanates from the device, in conjunction with that reflected from the outer surface of element 28. When element 22 is rotated by manual actuation of the handle 40, as, for example, in the direction of the arrow 52, light reflected from the mirror 20 becomes visible by continuously increasing amounts, a maximum thereof being perceptible when the optic axis 50 and the polarizing axis 48 are disposed in parallel relation, the optic axis 50 being taken as either the slow or fast axis of the component 26. Thus, between the two relative axial positions, producing, respectively, either minimum or maximum visible reflection of light from the mirror element 20, various degrees of reflectivity are possible.

A more detailed explanation of the foregoing operations is as follows. Assuming the superimposed linear light polarizer 30 and birefringent component 26, to have a 45° relation of their axes, they together constitute a so-called circular (circularly polarizing) light polarizer. The component 26, thus axially oriented, has a retardance of 90°. This produces a one-quarter or three-quarters phase difference in wave fronts for visible light between approximately 400 and 750 millicrons, or any selected band thereof. At the foregoing 45° angular relation, an entering unpolarized light beam, in passing through the linear polarizer 30 of element 28, becomes linearly polarized in a given vibration direction. Upon entering the quarter-wave component 26 of element 22, it is resolved into two orthogonally disposed vibration components having a phase difference of one-quarter wave. The emergent ray is a circularly polarized ray of a given rotation. When the ray is reflected from the specularly reflecting surface of mirror 20, its sense of rotation is reversed. Upon re-entering the quarter-wave retardation component 26, an additional one-quarter wave phase difference of the two ray components is produced. The total phase change, in twice passing through the quarter-wave retardation component 26, is thus one-half wave, the phase angle becoming one of 180°. The circularly polarized ray, accordingly, is transformed again into a linearly polarized ray but having an altered vibration direction, now at 90° to that of the linear light polarizer 30. Thus, it is absorbed by the latter. Assuming, however, a slight deviation from the aforesaid 45° axial relation at the maximum absorption position the polarization form is modulated toward an elliptical shape so that the reflected component is not completely absorbed.

When either the slow or fast axis of the birefringent retardation component 26 is parallel to the polarizing direction 48 of the component 30, the joint operation of the components 26 and 30 is essentially that which would occur by interposition of the linear polarizer 30 alone. The amount of absorption would, effectively, be merely that incurred by the light beam passing twice through the polarizer, to and from the reflector 20. Assuming the use of a sheet polarizer of the type "HN38," sold by Polaroid Corporation, Cambridge, Mass., U.S.A., the proportion of reflected to incident light can be varied from approximately zero to 35 percent with the aforesaid variation of axes from parallelism to a 45° relation.

Figure 3:
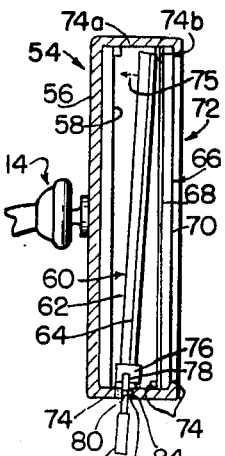
FIG. 3 is a diagrammatic side view, partly in cross-section, of a modification of the rear-view mirror device of the invention.

In FIG. 3 there is shown a modification 54 of the rear-view mirror device of the invention, particularly suited to a rectangular shape thereof. A housing 56 is adapted to be attached by adjustable means, such as ball-and-socket means 14, to an appropriate portion of the vehicle as, for example, near the upper-central area of the windshield. Within the housing 56 are mounted a plurality of rectangular-shaped elements as follows: a front-surface mirror 58, a composite element 60 including a light-transmitting supporting plate 62, e.g., composed of glass, having a birefringent layer 64 bonded thereto, and a composite element 66 including a linear light polarizing layer 68 bonded to a light-transmitting supporting plate 70, again preferably composed of glass. The plate 70 covers the open face 72 of the device through which light from the headlamps of a following vehicle is admitted and provides an abrasion resistant surface.

The elements 58 and 66 are fixedly mounted within the housing in parallel relation, being thus positioned by flanges 74, 74a and 74b. Element 60 is adapted to be rotated or tilted in a direction toward and away from the plane of element 66, as indicated by the arrow 75. It is thus pivotable about an axis parallel to the plane of element 66 from a first position parallel to elements 58 and 66 to the second position shown at an acute angle with respect thereto. The element 60 is attached to a transversely extending mounting bracket 76 which, in turn, is carried at each end by an angular arm 78, pivotally attached at bearing means 80 to the housing 56 and freely movable in the slot 81. The bearings 80 are of a frictional type whereby the element 60 is releasably held at the vertical or at any angle of tilt to which it has been brought. The parallel position is achieved through contact with the elongated flange 74a and the extreme angular position by contact with the elongated flange 74b, the flanges serving in this capacity as limit stops. A handle 82 is attached to one of the arms 78 for manually actuating the element 60. A flexible insert 84, composed of a sponge rubber or the like, is provided as a moisture and dust seal within the slot 81.

Figure 4:
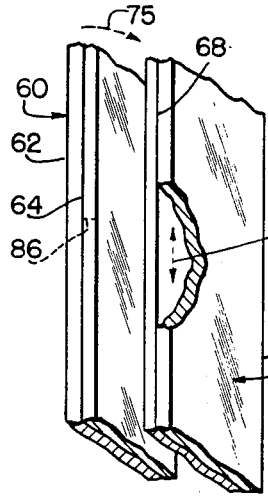
FIG. 4 is a diagrammatic perspective view of elements of the device of FIG. 3.

The birefringent layer or sheet 64 is of a uniaxial type. As shown in FIG. 4, its optic axis 86 is disposed approximately at 90° to the plane of the sheet. The vibration direction of the linear polarizing layer 68 is disposed in the plane of, and parallel to, the vertical dimension of the layer, as indicated at 88. With the element 60 parallel to element 66, as shown in FIG. 4, the effective birefringent property of component 64 is substantially zero and it may largely be assumed that the light beam undergoes merely the absorption involved in twice passing through the polarizer 68, as previously explained with respect to the structure of FIGURE 1. At a position of extreme tilt of element 60, as shown in FIG. 3, the birefringent property of component 64 is such as to provide approximately a quarterwave (or three-quarterswave) retardation between the two vibration components, with an ensuing substantially complete absorption of the reflected beam in the manner above-described, or it may, preferably, provide a retardation resulting in a slightly less absorption. Intermediate degrees of reflectivity are obtainable between the two extreme positions, that is, in addition to outer-surface reflection, varying amounts of reflection from the spectrally reflecting surface 58 are present, as provided by the attendant variation of retardation characteristics.

Alternatively, the birefringent component 64 may be of a biaxial type as, for example, one composed of a suitably molecularly oriented plastic material such as cellulose acetate. In this modification it is to be assumed that a biaxial birefringent component of a tiltable element such as element 60 has optic axes so disposed with respect to a vibration azimuth of a fixed linear polarizer such as component 68, that when the tiltable and fixed elements are parallel, a phase difference of approximately one-quarter wave between vibration components is provided. When the tiltable element is moved to a location similar to that illustrated in FIG. 3, a variation of positional relation of a principal axis of the birefringent component with respect to the vibration direction of the polarizer is produced such that no phase difference, or but a slight difference exists. The optical effects relative to an entering beam of light at the two extreme positions of the tiltable element, as well as intermediate positions thereof, are generally similar to those above described with respect to the structure of FIG. 3.

Figure 5:
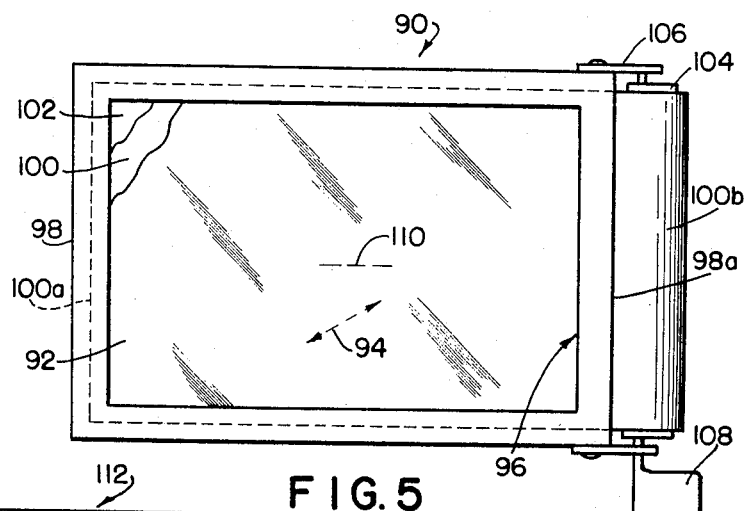
FIG. 5 is a diagrammatic facing view of another modification of the device of the present invention.
Figure 6:
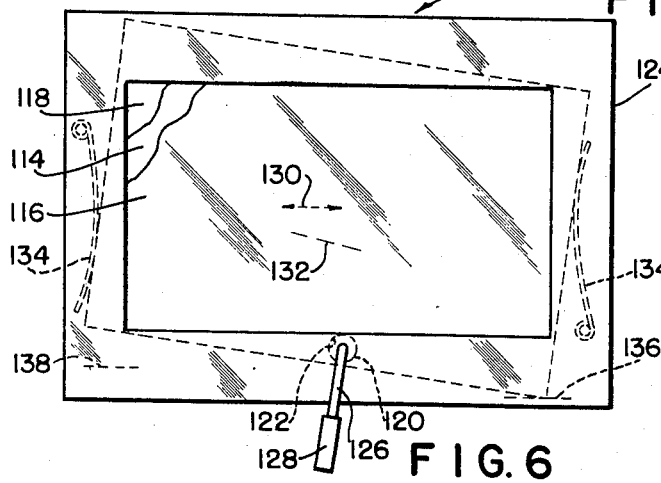
FIG. 6 is a diagrammatic facing view of still another modification of the device of the present invention.

FIGS. 5 and 6 illustrate two modifications of a rectangularly-shaped rearview mirror device embodying means for varying the retardation effects of a birefringent component it being understood that, in both examples, a spectrally reflecting surface is included in a relationship to other specified elements previously described. In the device 90 of FIG. 5, a linear light polarizing element 92, having a vibration direction 94, is fixedly mounted across the open face 96 of the housing 98. A stretchable, elastic transparent film 100 is mounted between, and in superimposed relation with, the polarizing element 92 and a reflecting surface 102. Film 100 is normally isotropic but has the property of becoming uniaxially birefringent when stretched and thus molecularly oriented. One elastic film material particularly suitable for the purpose is polyvinyl butyral but other materials having this characteristic may be employed. Means for effecting the aforesaid stretching and molecular orientation of film 100 include a cylindrical or cam-like element 104, rotatably and eccentrically mounted in brackets 106 and actuated by a handle or lever 108. One end of the film 100 is bonded at 100a to the housing. The other end 100b is firmly attached to the surface of cam 104. The element 104, when rotated by manual actuation of the handle 108 in a clockwise direction, as illustrated, is caused to move eccentrically, thereby tensioning the film 100 to render it birefringent, with an optic axis 110 disposed longitudinally thereof. Assuming a stretched thickness of the film 100 which is suitable to provide a correct birefringence, and assuming the indicated relative disposition of polarizing direction 94 and optic axis 110, e.g., at an angle of approximately 45°, a phase difference of one-quarter wave is provided between vibration components. When handle 108 is rotated in a counterclockwise direction, the film 100 is permitted to relax and resume its isotropic characteristic. Optical performance, under these and intermediate conditions, is similar to that previously described for comparable circumstances of retardation or non-retardation of vibration components.

The modification 112 of FIG. 6 is essentially an adaptation of the structure of FIGURE 1 to a rectangular shaped rearview mirror device. A birefringent element 114 is mounted for rotation between a fixed linear light polarizer 116 and a specularly reflecting surface 118. Means for thus mounting element 114 includes a shaft 120 frictionally mounted in an aperture 122 formed in the housing 124. An angled arm 126 and actuating handle 128 are integral with one end of the shaft. When the birefringent element is pivoted to the position indicated, a given acute angular relationship is established between the polarizing direction 130 of element 116 and the optic axis 132 of element 114. This relationship provides a given phase difference between vibration components such as to produce a large degree of absorption of an entering beam of light. When element 114 is rotated counterclockwise to a vertical position, vibration direction 130 and optic axis 132 become parallel, the phase difference is zero, and element 114 becomes effectively isotropic. Because of the relatively small angular movement of element 114 permitted in this modification, a compromise between complete absorption and complete transmission of the entering beam may be desirable for the two extreme positions, that is, values somewhat less than complete absorption and complete transmission are achieved at the respective positions. However, element 116 may also be mounted for rotation in an opposite direction to increase the angular displacement of the two axes, a single control effecting rotation of both elements, as by appropriate gear means, not shown. The resilient members 134, composed, for example, of a spring-like metal or plastic, serve a damping and positioning function relative to the pivotal element 114. The extreme positions of pivotal movement are established by limit stops 136 and 138.

As previously indicated, to obtain maximum reflectivity of an entering beam, the utilization in the present invention of a single linear polarizer and birefringent layer involves passage of the beam twice, only, through one linear polarizer. In any conventional system utilizing two linear polarizers the beam must pass twice through both polarizers, namely, the equivalent of transmittal four times by a single linear polarizer. Thus, the maximum reflectivity obtainable through the structure of the present invention is twice that of any structure embodying two superimposed linear polarizers.

Wherein, in FIGS. 4 and 6, a given relation of birefringent and polarizing axes is illustrated, it will be understood that the relative position of elements 60 and 66 or 114 and 116 can be varied to produce a similar result as, for example, the axial relationship shown in FIG. 4 can be provided at the tilted position of element 60 rather than at the parallel relation of elements 60 and 66. It is further to be understood that in the examples of FIGURES 1, 2 and 6, the birefringent element may, alternatively, be held stationary and the polarizing element mounted for rotation. Structure permitting rotation of the inner element is, however, a preferred embodiment.

The basic internal axial directions of birefringent materials shown in FIGS. 2 and 6 may, for example, be achieved by stretching a preformed sheet material or extruding a plastic composition into the form of a sheet material. The transverse orientation of the axis 86 in FIG. 4 may be obtained by applying a differential stress to opposite surfaces of a semisoftened sheet material; by passing a softened sheet material between pressure rolls rotating at different speeds; or by applying an electromagnetic or electrostatic force transversely of a sheet material which is adapted thereby to acquire orientation of its molecules in the direction indicated.

Materials, additional to those previously mentioned, for use in forming the birefringent component include, for example, ethyl cellulose, methyl cellulose, and polyvinyl alcohol. All of these substances are adapted to treatment involving mechanical or electrically induced stress to acquire predetermined birefringence characteristics. Whereas, in FIG. 5, a birefringent property is produced through stretching the film 100 it would conceivably be possible to compress a layer of material such as polyvinyl butyral when held between two rigid transparent plates to provide a given birefringence therewithin. The reflecting surface, may, alternatively, be formed directly on the innermost surface of the birefringent component or of its support to reduce unwanted multiple reflections and to provide a less-expensive construction. As previously intimated, the use of reflection-reducing coatings on a first surface and on any spaced internal surfaces may be desirable.

Wherein certain specific means have been shown for moving birefringent elements of the devices illustrated, it will be understood that modifications thereof are readily possible. For example, rotation thereof may be achieved by planetary gear means; tilting by mechanism including a rack, pinion and actuating knob; and extension of the film 100 of FIG. 5 by screw means.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A rearview mirror assemblage adapted to mounting in a vehicle for continuously and adjustable reducing glare produced by incident light rays from the headlamps of a following vehicle, comprising a housing having a rearwardly facing window, a linear polarizer having a given polarizing direction fixedly mounted in said housing so as to extend completely across said window, a birefringent element having a predetermined optic axis mounted for rotatable adjustment in plane parallel to and in cooperation with said polarizer to vary the retardation effect of said birefringent element on said light rays after they are polarized by passage through said polarizer, means for manually rotating said birefringent element within predetermined limits and means cooperating with said rotating means for releasably holding said birefringent element at any degree of rotation within said limits, the dimensions of said birefringent element being smaller than said internal housing dimensions and larger than those of said window whereby at any position of said birefringent element the projected area of said window is always covered thereby, and metallic reflecting means parallel to said polarizer and optically aligned with said polarizer and said birefringent element located in said housing wherein light reaches said reflecting means after passing through said polarizer and said birefringent element, said manual rotating means controls the angular relationship of said optic axis and said polarizing direction whereby said light rays are elliptically polarized and absorbed by said polarizer in accordance with the angular relationship selected between said optic axis and said polarizing direction after reflection from said reflecting means and transmission through said birefringent element a second time whereby light rays are continuously attenuated in relation to the rotational position of said birefringent element.

References Cited

UNITED STATES PATENTS

| | | | |
|---|---|---|---|
| 2,005,426 | 6/1935 | Land | 350—16 |
| 2,062,764 | 12/1936 | Sands et al. | 350—280 |
| 2,285,792 | 6/1942 | Bailey | 350—157 |
| 2,367,096 | 1/1945 | Chubb | 350—156 |
| 2,433,503 | 12/1947 | Young | 350—156 |
| 2,502,699 | 4/1950 | Budreck | 350—280 |
| 2,773,422 | 12/1956 | Flynn et al. | 350—156 |
| 2,819,459 | 1/1958 | Dodd | 350—156 |
| 3,004,473 | 10/1961 | Arthur et al. | 350—281 |
| 3,183,763 | 5/1965 | Koester | 350—157 |
| 3,253,510 | 5/1966 | Clayton | 350—281 |

OTHER REFERENCES

Dery, "Controlling Light Behavior Through Linear, Circular and Spectrally Selective Polarisers," Manufacturing Optician, vol. 17, No. 6, March 1964, pp. 268–270.

DAVID SCHONBERG, Primary Examiner

PAUL R. GILLIAM, Assistant Examiner

U.S. Cl. X.R.

350—156